US006408971B1

(12) United States Patent
Grant

(10) Patent No.: US 6,408,971 B1
(45) Date of Patent: Jun. 25, 2002

(54) TRACKED VEHICLE WITH LOAD BALANCING SYSTEM

(76) Inventor: Sonny Grant, P.O. Box 7186, Spanish Fort, AL (US) 36577

( * ) Notice: Subject to any disclaimer, the term of this patent is extended or adjusted under 35 U.S.C. 154(b) by 0 days.

(21) Appl. No.: 09/638,449

(22) Filed: Aug. 14, 2000

(51) Int. Cl.[7] .............................................. B62D 33/06
(52) U.S. Cl. ..................... 180/89.13; 280/755; 280/757; 280/758
(58) Field of Search ................ 180/89.13; 280/755, 280/757, 758, 759

(56) References Cited

U.S. PATENT DOCUMENTS 6,145,609 A * 11/2000 Hoelscher .................. 180/9.44

FOREIGN PATENT DOCUMENTS

| JP | 4-306181 | * 10/1992 | .................. 280/755 |
| SU | 528051 | * 10/1976 | .............. 180/89.13 |

* cited by examiner

Primary Examiner—Eric Culbreth
(74) Attorney, Agent, or Firm—Joseph N. Breaux

(57) ABSTRACT

A tracked vehicle that includes a mechanism for positioning the cab assembly and any loads supported by the cab assembly forward or rearward along the tracked chassis so that the weight of the cab assembly and load is more evenly distributed onto the earth contacting surfaces of the tracks of the tracked chassis and thereby minimize the chance of the tracked vehicle becoming bogged down.

1 Claim, 3 Drawing Sheets

TRACKED VEHICLE WITH LOAD BALANCING SYSTEM

TECHNICAL FIELD

The present invention relates to equipment used on unpaved ground surfaces and more particularly to a tracked vehicle with a load balancing system for use in lumbering operation and the like on earth surfaces with little weight bearing capacity; the tracked vehicle with load balancing system including a tracked chassis assembly having a pair of tracks and a cab attachment rail assembly; a cab assembly slidably mounted to the cab attachment rail assembly such that the cab assembly slides between a forward cab position and a rearward cab position with respect to the tracked chassis assembly; and a cab assembly positioning assembly including a dual rod hydraulic cylinder assembly including a cylinder barrel connected to the cab assembly and two opposed piston rods each having a rod end connected to an opposed tracked chassis assembly end, a hydraulic pump having hydraulic outputs in connection with the dual rod hydraulic cylinder through a hydraulic control valve for controlling movement of cylinder barrel such that he cab assembly moves forward and rearward with respect to the tracked chassis assembly in response to movement of the cylinder barrel with respect to the two opposed piston rods; the hydraulic control valve being positioned on the hydraulic cab assembly such that operation of the hydraulic control valve allows an operator positioned in the cab assembly to position the cab assembly forward and rearward on the tracked chassis assembly such that the weight of the cab assembly and any load supported by the cab assembly is positioned to provide the most balanced load on the tracks of the tracked chassis assembly to prevent sections of the tracks from bearing greater weight loads than other sections of the tracks and thereby allow the combined weight of the tracked vehicle with load balancing system to be spread over a larger earth contacting surface area of the tracks such that the tracked vehicle with load balancing system may be operated on soils with lower load bearing capacities than a substantially identical tracked vehicle without the load balancing system.

BACKGROUND ART

Tracked vehicles are often used to gain access to areas where roads do not exist and soil conditions are such that the soils are incapable of supported vehicles with tires. It is thus desirable to provide lumbering equipment and construction equipment such as pipe line construction equipment with tracks to spread the weight of the vehicle over a larger area thus allowing the vehicle to travel over soils with limited support capacity. Although tracked vehicles can be used on soils with poor support characteristics, sometimes, such as in the case of lumbering equipment, the equipment is required to lift heavy loads causing the weight distribution on the earth contacting surfaces of the tracks to become unbalanced resulting in heavier loads on sections or portions of the tracks that are excessive for the soil conditions causing the vehicle to become bogged down. It would be desirable, therefore, to have a tracked vehicle that included a mechanism for positioning the cab assembly and any loads supported by the cab assembly forward or rearward along the tracked chassis so that the weight of the cab assembly and load could be more evenly distributed onto the earth contacting surfaces or portions of the tracks and thereby minimize the chance of the tracked vehicle becoming bogged down as previously described.

GENERAL SUMMARY DISCUSSION OF INVENTION

It is thus an object of the invention to provide a tracked vehicle with load balancing system that includes a tracked chassis assembly having a pair of tracks and a cab attachment, rail assembly; a cab assembly slidably mounted to the cab attachment rail assembly such that the cab assembly slides between a forward cab position and a rearward cab position with respect to the tracked chassis assembly; and a cab assembly positioning assembly including a dual rod hydraulic cylinder assembly including a cylinder barrel connected to the cab assembly and two opposed piston rods each having a rod end connected to an opposed tracked chassis assembly end, a hydraulic pump having hydraulic outputs in connection with the dual rod hydraulic cylinder through a hydraulic control valve for controlling movement of cylinder barrel such that the cab assembly moves forward and rearward with respect to the tracked chassis assembly in response to movement of the cylinder barrel with respect to the two opposed piston rods; the hydraulic control valve being positioned on the hydraulic cab assembly such that operation of the hydraulic control valve allows an operator positioned in the cab assembly to position the cab assembly forward and rearward on the tracked chassis assembly such that the weight of the cab assembly and any load supported by the cab assembly is positioned to provide the most balanced load on the tracks of the tracked chassis assembly to prevent sections of the tracks from bearing greater weight loads than other sections of the tracks and thereby allow the combined weight of the tracked vehicle with load balancing system to be spread over a larger earth contacting surface area of the tracks such that the tracked vehicle with load balancing system may be operated on soils with lower load bearing capacities than a substantially identical tracked vehicle without the load balancing system.

Accordingly, a tracked vehicle with load balancing system is provided. The tracked vehicle with load balancing system includes a tracked chassis assembly having a pair of tracks and a cab attachment rail assembly; a cab assembly slidably mounted to the cab attachment rail assembly such that the cab assembly slides between a forward cab position and a rearward cab position with respect to the tracked chassis assembly; and a cab assembly positioning assembly including a dual rod hydraulic cylinder assembly including a cylinder barrel connected to the cab assembly and two opposed piston rods each having a rod end connected to an opposed tracked chassis assembly end, a hydraulic pump having hydraulic outputs in connection with the dual rod hydraulic cylinder through a hydraulic control valve for controlling movement of cylinder barrel such that the cab assembly moves forward and rearward with respect to the tracked chassis assembly in response to movement of the cylinder barrel with respect to the two opposed piston rods; the hydraulic control valve being positioned on the hydraulic cab assembly such that operation of the hydraulic control valve allows an operator positioned in the cab assembly to position the cab assembly forward and rearward on the tracked chassis assembly such that the weight of the cab assembly and any load supported by the cab assembly is positioned to provide the most balanced load on the tracks of the tracked chassis assembly to prevent sections of the tracks from bearing greater weight loads than other sections of the tracks and thereby allow the combined weight of the tracked vehicle with load balancing system to be spread over a larger earth contacting surface area of the tracks such that the tracked vehicle with load balancing system may be operated on soils with lower load bearing capacities than a substantially identical tracked vehicle without the load balancing system.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
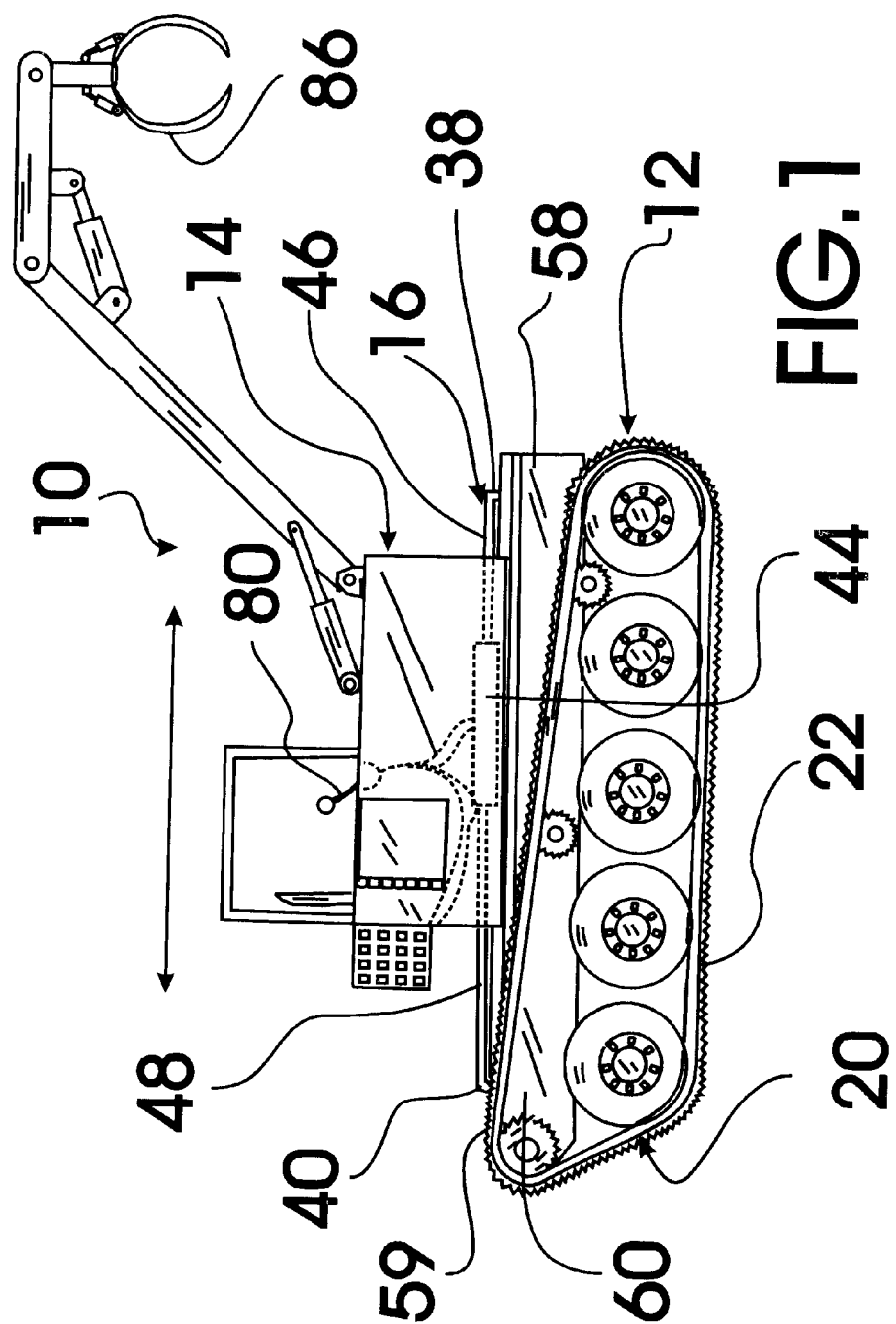
FIG. 1 is a side plan view of an exemplary embodiment of the tracked vehicle with load balancing system of the present invention showing the tracked chassis assembly.
Figure 2:
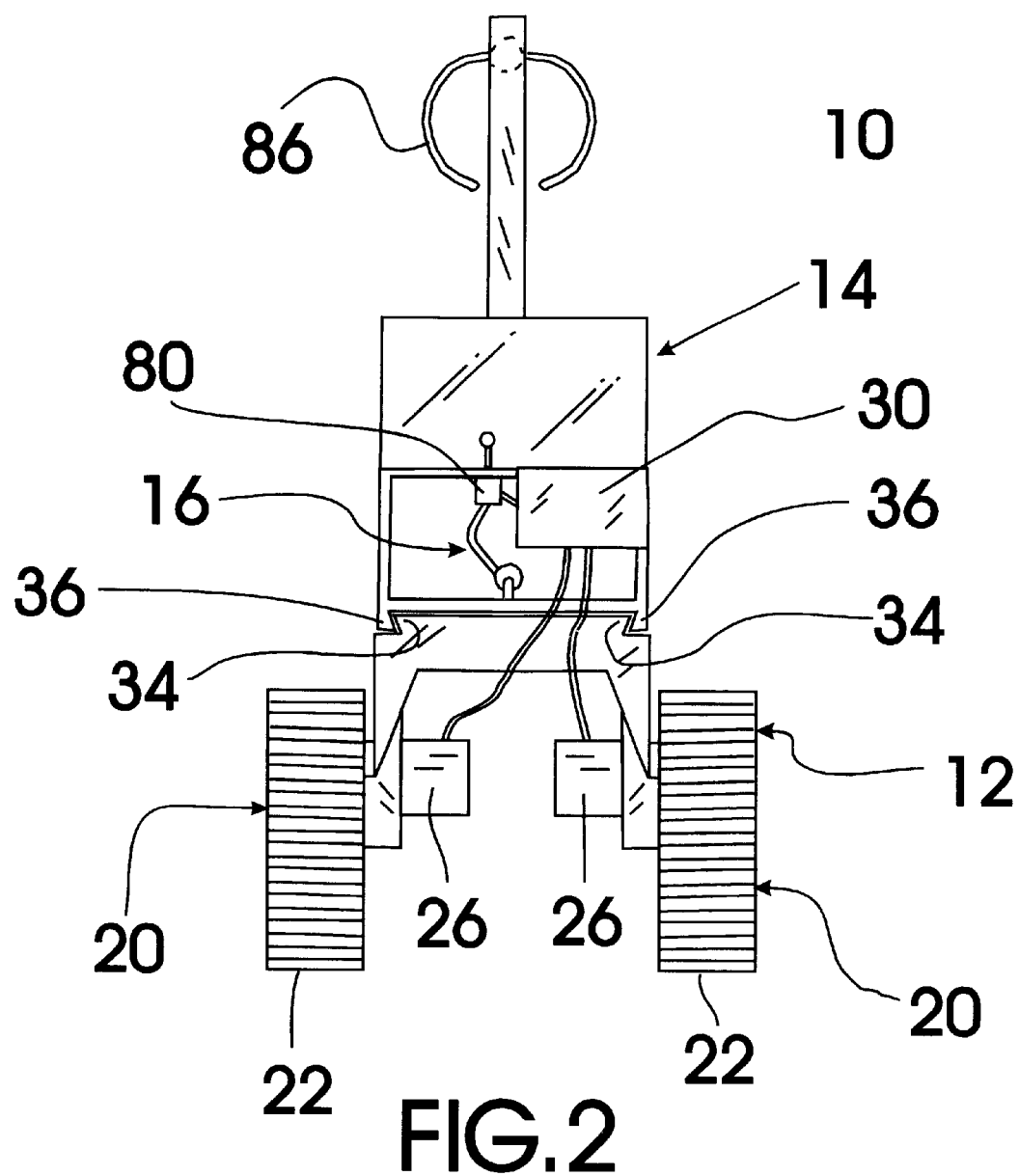
FIG. 2 is an end plan view of the tracked vehicle with load balancing system.
Figure 3:
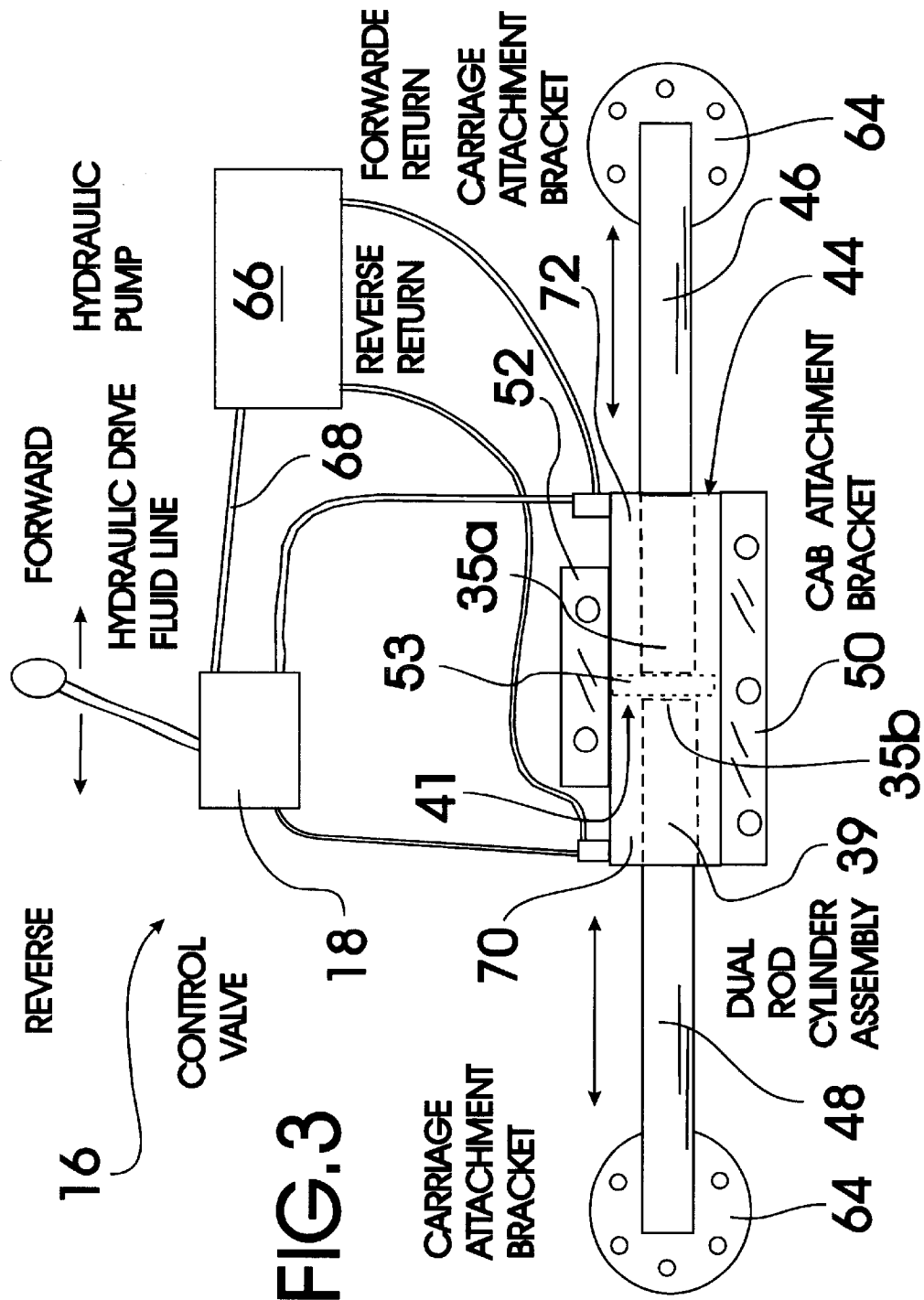
FIG. 3 is a schematic diagram of the hydraulic cab assembly positioning assembly.

FIGS. 1–3 show various aspects of an exemplary embodiment of the tracked vehicle with load balancing system of the present invention generally designated 10. Tracked vehicle with load balancing system 10 includes a tracked chassis assembly, generally designated 12; a cab assembly, generally designated 14; and a hydraulic cab assembly positioning assembly, generally designated 16. Although a hydraulically powered cab assembly positioning system is used in this embodiment, it should be understood that other mechanical mechanisms capable of providing sufficient motive force, such as motor powered screw movements and the like, to accomplish the task may be substituted without departing from the spirit of the inventive concept taught herein.

Tracked chassis assembly 12 has a pair of powered tracks, generally designated 20, that are used to propel tracked vehicle with load balancing system 10 along the earth surface by contact between the earth surface and the earth contacting surface area 22 of each of the of the powered tracks 20. In this embodiment, powered tracks 20 are each driven by a hydraulic motor 26 that are each powered by a hydraulic pump assembly 30 mounted on cab assembly 14. Tracked chassis assembly 12 also includes a cab attachment rail assembly 34 upon which a cab slide assembly 36 of cab assembly 14 is slidably mounted. Cab assembly 14 is slidably mounted to cab attachment rail assembly 34 such that cab assembly 14 slides between a forward cab position 38 and a rearward cab position 40 with respect to tracked chassis assembly 12.

Hydraulic cab assembly positioning assembly 16 includes a dual rod hydraulic cylinder assembly, generally designated 44, with a cylinder barrel 39 having carriage attachment brackets 50, 52 and two opposed piston rod assemblies 46, 48 that are attached at the internal ends 35a, 35b thereof to a slidable piston head 53, slidably mounted within a piston cylinder 41 formed along the length of cylinder barrel 39. Cylinder barrel 39 of dual rod hydraulic cylinder assembly 44 is connected to cab assembly 14 using connecting brackets 50, 52 and piston rod assemblies 46,48 are attached to the front 58 and rear 59, respectively, of the tracked chassis assembly 12 using their respective carriage attachment brackets 64. Hydraulic cab assembly positioning assembly 16 also includes a hydraulic pump, generally designated 66 having a hydraulic output 68 in connection with forward and rearward acting cylinder sections 70, 72 of piston cylinder 41 of dual rod hydraulic cylinder assembly 44 through a hydraulic control valve 80 for allowing an operator to control movement of piston head 53 along the length of piston cylinder 41 of cylinder barrel 39 along piston rods 46, 48 such that cab assembly 14 moves forward and rearward with respect to tracked chassis assembly 12 in response to movement of cylinder barrel 39 along piston rods 46, 48. Hydraulic control valve 80 is positioned on hydraulic cab assembly 14 such that operation of the hydraulic control valve 80 allows an operator positioned in the hydraulic cab assembly 14 to position hydraulic cab assembly 14 forward or rearward on tracked chassis assembly 12 such that the weight of hydraulic cab assembly 12 and any load supported by hydraulic cab assembly 14 by grasping elements 86 is positioned to provide the most balanced load on the tracks 20 of the tracked chassis assembly to prevent the some sections of the earth contacting portions 22 of the tracks 20 from bearing greater weight loads than other sections of the earth contacting portions 22 and thereby allow the combined weight of the tracked vehicle with load balancing system 10 to be spread over the complete earth contacting surface area 22 of the tracks 20 such that the tracked vehicle with load balancing system 10 may be operated on soils with lower load bearing capacities than a substantially identical tracked vehicle without the load balancing system.

It can be seen from the preceding description that a tracked vehicle with load balancing system has been provided.

It is noted that the embodiment of the tracked vehicle with load balancing system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A tracked vehicle with load balancing system comprising:

a tracked chassis assembly having a pair of tracks and a cab attachment rail assembly;

a cab assembly slidably mounted to the cab attachment rail assembly such that the cab assembly slides between a forward cab position and a rearward cab position with respect to the tracked chassis assembly; and a cab assembly positioning assembly including a dual rod hydraulic cylinder assembly including a cylinder barrel connected to the cab assembly and two opposed piston rods; the cylinder barrel having a piston cylinder defined therein along the length thereof; each of the two opposed piston rods having a rod end connected to an opposed tracked chassis assembly end and a piston head end attached to a piston head slidably positionable within and between opposed ends of the piston cylinder of the cylinder barrel, a hydraulic pump having hydraulic outputs in connection with the dual rod hydraulic cylinder assembly through a hydraulic control valve for controlling movement of the cylinder barrel with respect to the piston head of the cylinder barrel such that the cab assembly moves forward and rearward in connection with the cylinder barrel with respect to the tracked chassis assembly in response to movement of the cylinder barrel with respect to the two opposed piston rods;

the hydraulic control valve being positioned on the hydraulic cab assembly such that operation of the hydraulic control valve allows an operator positioned in the cab assembly to position the cab assembly forward and rearward on the tracked chassis assembly such that the weight of the cab assembly and any load supported by the cab assembly is positioned to provide the most balanced load on the tracks of the tracked chassis assembly to prevent sections of the tracks from bearing greater weight loads than other sections of the tracks and thereby allow the combined weight of the tracked vehicle with load balancing system to be spread over a larger earth contacting surface area of the tracks such that the tracked vehicle with load balancing system may be operated on soils with lower load bearing capacities than a substantially identical tracked vehicle without the load balancing system.

* * * * *